(12) United States Patent
Chen et al.

(10) Patent No.: US 6,755,638 B2
(45) Date of Patent: Jun. 29, 2004

(54) APPARATUS FOR PRODUCING CONTINUOUS EXTRUSION MOLDING

(75) Inventors: Chun-Chin Chen, Hsinchu (TW); Chung-Hsien Wu, Taipei (TW); Ting-Goang Liang, Hsinchu (TW); Hsi-Hsin Shih, Taichung (TW)

(73) Assignee: Professionals Auto Parts International Co., Ltd., Taipei (TW)

( * ) Notice: Subject to any disclaimer, the term of this patent is extended or adjusted under 35 U.S.C. 154(b) by 407 days.

(21) Appl. No.: 10/001,814

(22) Filed: Dec. 5, 2001

(65) Prior Publication Data

US 2003/0102592 A1 Jun. 5, 2003

(51) Int. Cl.$^7$ .............................................. B29C 47/12
(52) U.S. Cl. ...................... 425/381; 425/309; 425/311; 425/465; 425/466
(58) Field of Search ................................ 425/309, 310, 425/311, 380, 381, 465, 466

(56) References Cited

U.S. PATENT DOCUMENTS

| | | | | |
|---|---|---|---|---|
| 3,902,835 A | * | 9/1975 | Theysohn | ................... 425/380 |
| 4,548,568 A | * | 10/1985 | Herbert et al. | ............... 425/466 |
| 4,666,392 A | * | 5/1987 | Gerloff et al. | ............... 425/466 |
| 4,799,874 A | * | 1/1989 | Bellmer et al. | ............. 425/466 |
| 5,153,010 A | * | 10/1992 | Tashiro et al. | ............... 425/309 |
| 5,167,893 A | * | 12/1992 | Yada et al. | ................. 425/466 |
| 5,281,291 A | * | 1/1994 | Yada et al. | ................. 425/466 |
| 5,468,438 A | * | 11/1995 | Yada | .......................... 425/466 |
| 5,772,940 A | * | 6/1998 | Aoyama | ..................... 425/466 |
| 6,174,477 B1 | * | 1/2001 | Nagahashi et al. | ......... 425/466 |

* cited by examiner

*Primary Examiner*—Tim Heitbrink
(74) *Attorney, Agent, or Firm*—Sughrue Mion, PLLC (57) ABSTRACT

A molding machine for producing a continuous extrusion molding product with varying profile includes a die with an inlet for receiving molten material, a channel, an outlet, and shaping knives rotatable around axes non-parallel to the flow direction of the molten material between first and second operational positions. Shaping knives have molding surfaces and together define a first contour in the outlet when the shaping knives are in their first operational positions, and define a second contour in the outlet when the shaping knives are in their second operational positions. Shaping knives can be rotated around axes perpendicular or oblique to the flow direction of molten material.

11 Claims, 13 Drawing Sheets

APPARATUS FOR PRODUCING CONTINUOUS EXTRUSION MOLDING

BACKGROUND OF THE INVENTION

1. Field of the Invention

The present invention is directed to a method and apparatus for producing a continuous extrusion molding product with a varying profile. More particularly, the present invention is directed to a molding machine having shaping knives rotatable around axes substantially non-parallel to the flow direction of the extruded material.

2. Description of the Related Art

Molding products are useful for sealing spaces between, for example, the edge of a windshield and the body panel of a vehicle. In the case of automobile windshield molding, it is well known in the art that varying the profile of a molding strip along its length can obtain various advantages, for example the formation of water-draining channels for receiving water flowing on the surface of the windshield. Numerous designs for automobile windshield molding strips with a varying profile have been proposed.

Figure 1:
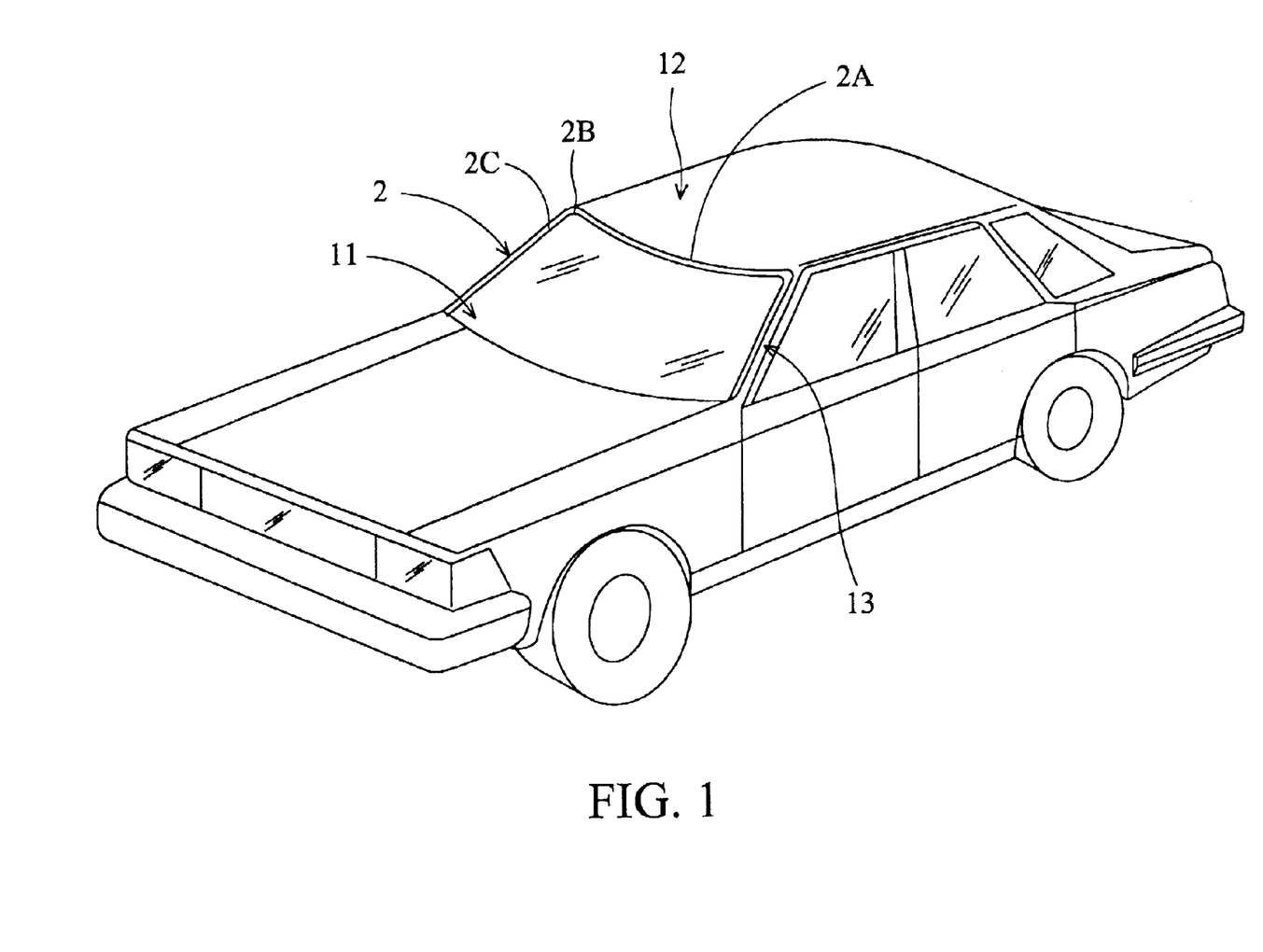
FIGS. 1 and 2 illustrate an example of automobile windshield molding.
Figure 2:
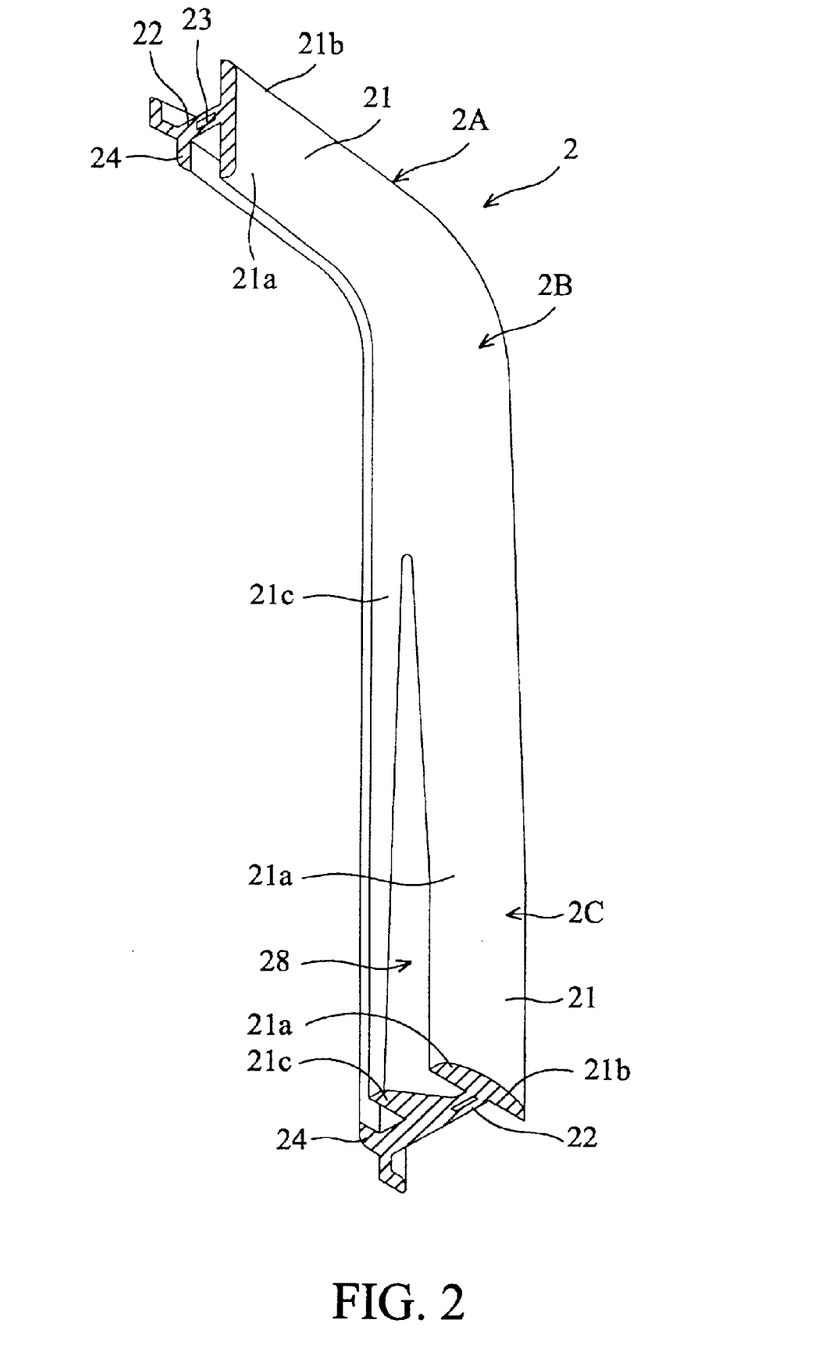

FIGS. 1 and 2 illustrate one example of a molding strip with a varying profile for sealing the space between a windshield and an opening in the frame of a vehicle body. Molding strip 2 is a continuous plastic strip comprising three sections: an upper section 2A mounted between the upper edge of the windshield 11 and the roof panel 12, a side section 2C mounted between the side edges of windshield 11 and the pillar panels 13, and corner sections 2B joining the upper section 2A with side sections 2C at the corners of windshield 11. Molding strip 2 comprises exterior wing 21 including an inward wing portion 21a and an outward wing portion 21b, connecting portion 22, and foot 24.

Outward wing portion 21b is for covering the periphery of the vehicle body panels 12, 13 and is of uniform thickness along its length. As illustrated in FIG. 2, the profile of molding strip 2 varies along the length of side section 2C such that inward wing portion 21a gradually thickens from corner section 2B to the central portion of side section 2C. As inward wing 21a thickens, connecting portion 22 lengthens and sub-inward wing 21c diverges from inward wing 21a to form water drain channel 28. Water drain channel 28 gradually widens and deepens towards the center of side section 2C and then gradually becomes thinner and shallower towards the lower extreme of side section 2C. The profile of corner section 2B is the same as that of upper molding 2A; the flexible quality of molding 2 allows it to be deformed and fitted around the corner of windshield 11. Metal wire 23 is embedded in molding strip 2 to reinforce the strip.

Figure 3A:
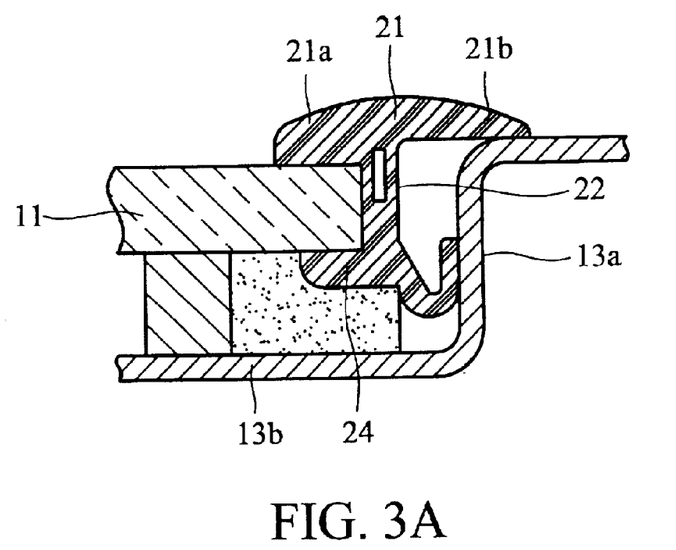
FIGS. 3A and 3B show cross-sectional views of the automobile windshield molding shown in FIGS. 1 and 2 installed between a windshield and the frame of a vehicle.
Figure 3B:
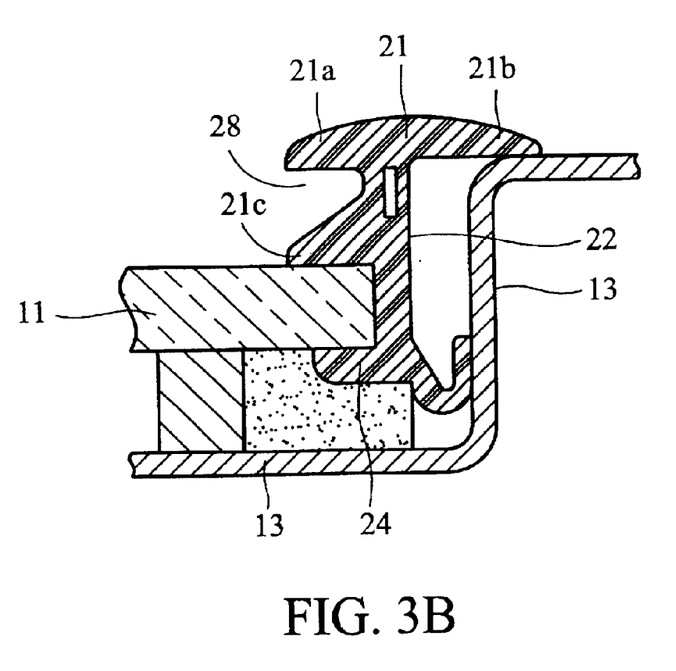

FIG. 3A shows a cross-sectional view of molding strip 2 installed between windshield 11 and roof panel 12. FIG. 3B shows a cross-sectional view of molding strip 2 installed between windshield 11 and a central portion of pillar panel 13. In FIG. 3A, the windshield 11 is received between foot 24 and inward wing 21a. In FIG. 3B, connecting portion 22 is lengthened and windshield 11 is received between sub-inward wing 21c and foot 24. A water drain channel 28 is formed between inward wing 21a and sub-inward wing 21c.

Figure 4:
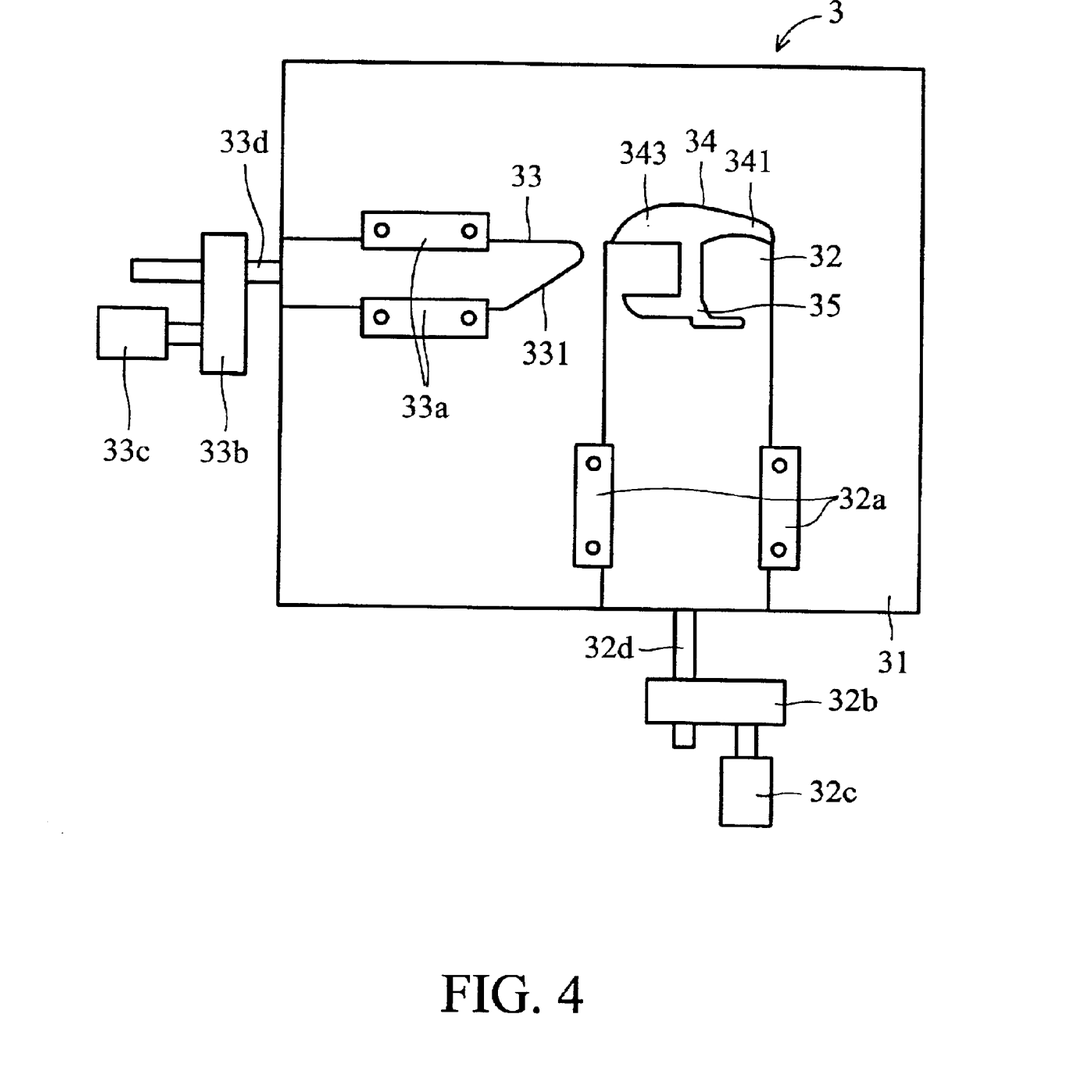
FIG. 4 illustrates a first molding machine of the prior art with the dies in a first operational position.
Figure 5:
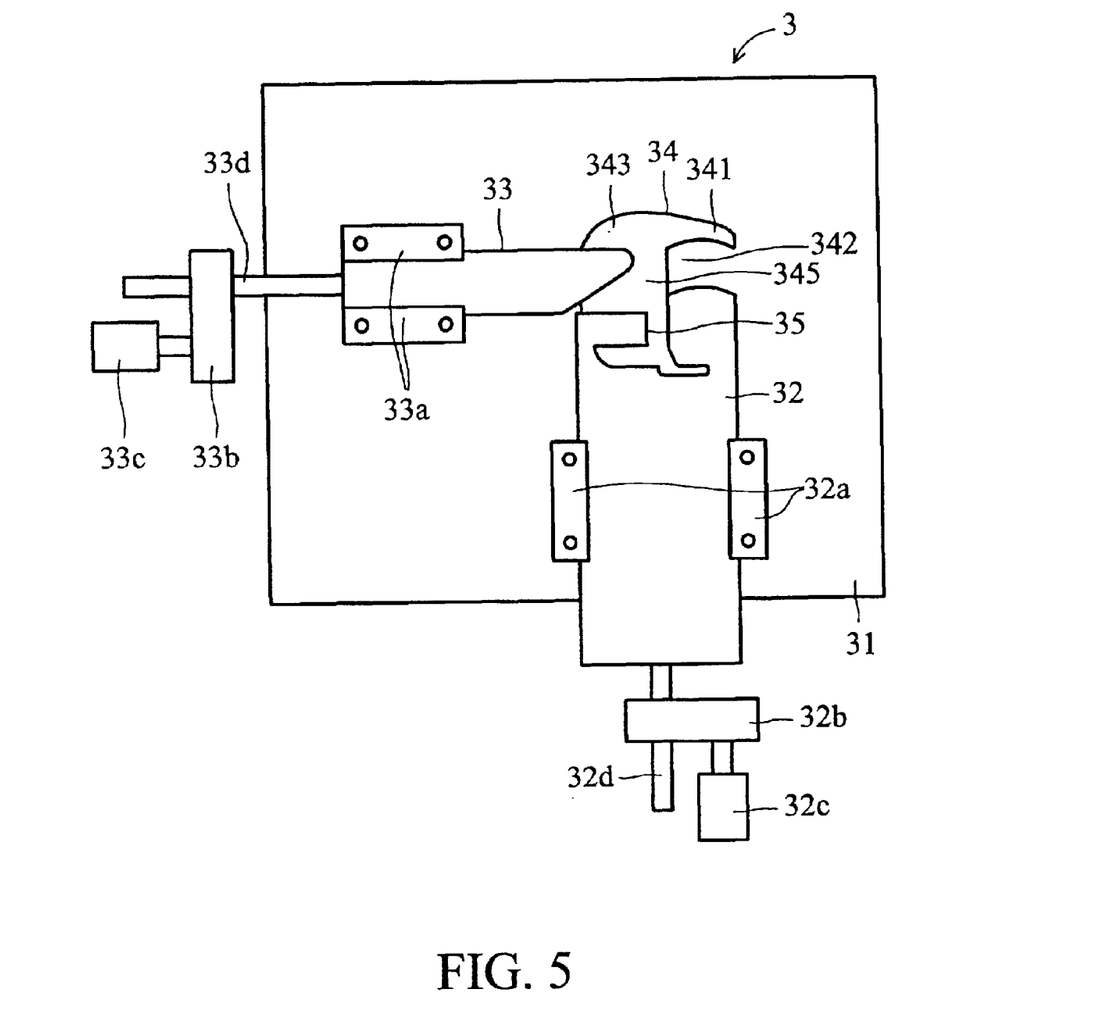
FIG. 5 illustrates a first molding machine of the prior art with the dies in a second operational position.

FIGS. 4 and 5 illustrate a prior art molding machine 3 for producing the molding strip 2. Molding machine 3 comprises die 31 and shaping knives 32 and 33. In FIGS. 4 and 5, plastic material to be extruded flows in a direction perpendicular to the plane of the illustrations. Die 31 is stationary and has an opening 34 in the shape of a vertically long rectangle, where the upper portion of the rectangle corresponds to the cross-sectional profile of exterior wing 21. Specifically, the contour of portion 341 corresponds to the cross-sectional profile of outward wing 21b, the contour of portion 343 corresponds to the cross-sectional profile of inward wing 21a, and the contour of portion 345 corresponds to the cross-sectional shape of sub-inward wing 21c.

Shaping knives 32, 33 are rectangular plates supported by guides 32a and 32b, respectively, and are movable in the plane of the illustration, e.g., movable in a plane perpendicular to the flow direction of the plastic material to be extruded. Shaping knife 32 has an opening 35 with a contour corresponding to the cross-sectional profile of foot 24. When in a first operational position illustrated in FIG. 4, shaping knife 32 is positioned on die 31 such that the openings 34, 35 are in the cross-sectional shape of molding strip 2 before inward wing 21a is thickened. As the plastic material is extruded, shaft 32d connected to a converter 32b and motor 32c gradually moves shaping knife 32 to a second operational position illustrated in FIG. 5 such that inward wing 21a is thickened. A reciprocal motion is performed to cause inward wing 21a to become gradually thinner.

Shaping knife 33 has a slanted edge 331 with a contour corresponding to the cross-sectional profile of water drain channel 28. When in a first operational position illustrated in FIG. 4, shaping knife 33 is positioned outside of the flow of the plastic material. As the plastic material is extruded, shaft 33d connected to a converter 33b and motor 33c gradually moves shaping knife 32 to a second operational position illustrated in FIG. 5 such that water drain channel 28 is formed. A reciprocal motion is performed to cause water drain channel 28 to become gradually less deep and thinner.

Figure 6:
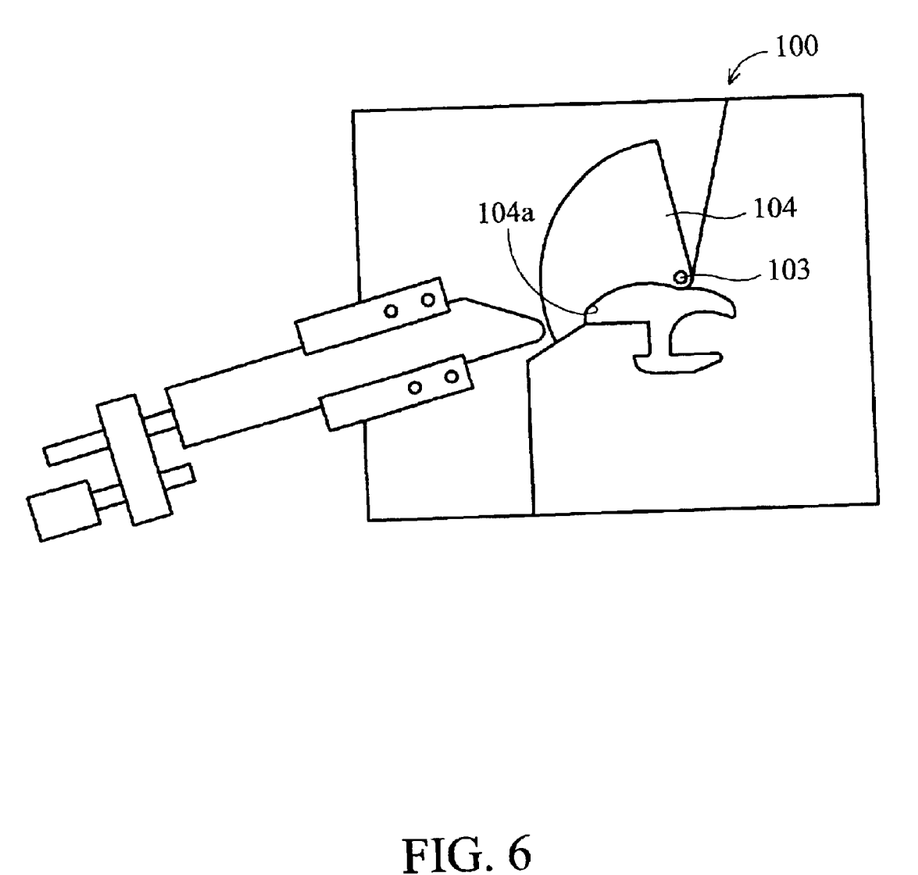
FIG. 6 illustrates a second molding machine of the prior art.

FIG. 6 illustrates another molding machine 100 of the prior art in which die 104 rotates about pin 103 in a plane perpendicular to the flow of the plastic material to be extruded such that the cross-sectional shape of opening 104a is changed during extrusion of the plastic material.

The molding machines of the prior art are able to produce molding products with varying profiles. However, because the movement of the dies is in a plane perpendicular to the flow of the plastic material, the streamlines of the flow of the plastic material around the edges of the dies are significantly disrupted, thereby causing wrinkles on the final product. Furthermore, sudden pressure changes in the portions of the flow may result in stagnation points where plastic material is trapped and hardened. This also results in wrinkles and even burrs on the final product. Finally, the movement of the dies between operational positions in the molding machines of the prior art causes a sudden increase in flow pressure against the dies. As a result, the parts of the molding machine suffer fatigue and wear-and-tear.

SUMMARY OF THE INVENTION

It is therefore an object of this invention to provide a method and apparatus for producing a continuous extrusion molding product with a varying profile, in which the molding machine has shaping knives rotatable around axes substantially non-parallel to the flow direction of the molten material to be extruded.

It is another object of this invention to provide a method and apparatus for producing a continuous extrusion molding product with a varying profile, in which the rotation of shaping knives around axes perpendicular or oblique to the flow direction of the molten material to be extruded allows the contour of the opening between the dies to be manipulated across a gradient of shapes and sizes to produce a smooth change in profile of the molded product.

It is yet another object of the invention to provide a method and apparatus for producing a continuous extrusion molding product with a varying profile, in which disruption of the flow and sudden pressure changes in portions thereof caused by the movement of shaping knives is significantly reduced, thereby reducing wrinkles and burrs on the final product.

According to a first aspect of the present invention, there is provided a molding machine for producing a molding product with varying profile comprising: a die with an inlet for receiving molten material, a channel, and an outlet, the channel directing the molten material from the inlet to the outlet along a first axis; a first shaping knife, rotatable around a second axis non-parallel to the first axis between a first operational position and a second operational position, the shaping knife having a first molding surface; and a second shaping knife, rotatable around a third axis non-parallel to the first axis between a first operational position and a second operational position, the shaping knife having a second molding surface; whereby the first and second molding surfaces together define a first contour in the outlet when the first and second shaping knives are in their first operational positions, and define a second contour in the outlet when the first and second shaping knives are in their second operational positions. In a preferred embodiment, the shaping knife is rotatable around an axis perpendicular to the first axis while the shaping knife is rotatable around an axis oblique to the first axis. Both shaping knives have leading edges which are wedge shaped to more easily cut into the flow of molten material. Molding surfaces may also be provided in the outlet.

In the preferred embodiment, the molding product is automobile windshield molding have an outer wing portion, an inner wing portion, a connecting portion and a foot. the profile of the inner wing portion varies between a first profile in which in the inner wing portion has a first thickness and a second profile in which the inner wing portion has a second thickness thicker than the first thickness. A water channel is formed in the inner wing portion of the second profile. Generally, the contour of the first molding surface corresponds to the profile of the foot, the contour of the second molding surface corresponds to the profile of the water drain channel, and the contour of the molding surface on the outlet corresponds to the outer wing. When the first and second shaping knives are in their first operational positions, the contour of the outlet corresponds to the first profile, and when the first and second shaping knives are in their second operational positions, the contour of the of the outlet corresponds to the second profile.

According to a second aspect of the present invention, there is provided a method of producing a continuous extrusion molding product including the steps of: extruding molten material though an opening in a die when first and second shaping knives are in a first operational position together defining a first contour in the opening to form a molding product with a first profile; and gradually rotating the first shaping knife about a first axis perpendicular to the flow direction of the molten material to a second operational position and gradually rotating the second shaping knife about an axis oblique to the flow direction of the molten material to a second operational position, the second operational positions of the first and second shaping knives defining a second contour in the opening, to alter the profile of the molding product across a gradient range of intermediate profiles to a second profile. The molten material is thermoplastic resin, elastomer, or foam resin. An additional step of rotating the first and second shaping knives from their second operational positions to the first operational positions may also be performed.

The method and apparatus of the present invention is suitable for molding any molding product with a profile that varies along its length. Examples of molding products for which the method and apparatus of the present invention is suitable are automobile windshield molding, plastic rope and mats, and architectural frame molding.

In the molding machine of the present invention, the shaping knives are rotated about axes perpendicular or oblique flow to the flow direction of the molten material to be extruded; thus, the intrusion of the shaping knives into the flow of molten material is smoother than that of the dies of the prior art. As a result, the disruption of the streamlines of the flow of the molten material around the edges of the dies is significantly reduced, thereby reducing or even eliminating wrinkles on the final product. This effect can be enhanced by using shaping knives with leading edges having a wedged profile.

In addition, sudden pressure changes in the portions of the flow resulting in stagnation points in the flow are avoided, thereby eliminating the problem of molten material being trapped and hardened in the molding machine of the present invention.

Finally, because the movement of the shaping knives between operational positions cuts into the flow of molten material in a smooth fashion, there is no sudden increase in flow pressure against the shaping knives. As a result, the parts of the molding machine suffer less fatigue and wear-and-tear than those in the prior art.

BRIEF DESCRIPTION OF DRAWINGS

The following detailed description, given by way of examples and not intended to limit the invention to the embodiments described herein, will best be understood in conjunction with the accompanying drawings, in which.

DETAILED DESCRIPTION OF THE INVENTION

Figure 7A:
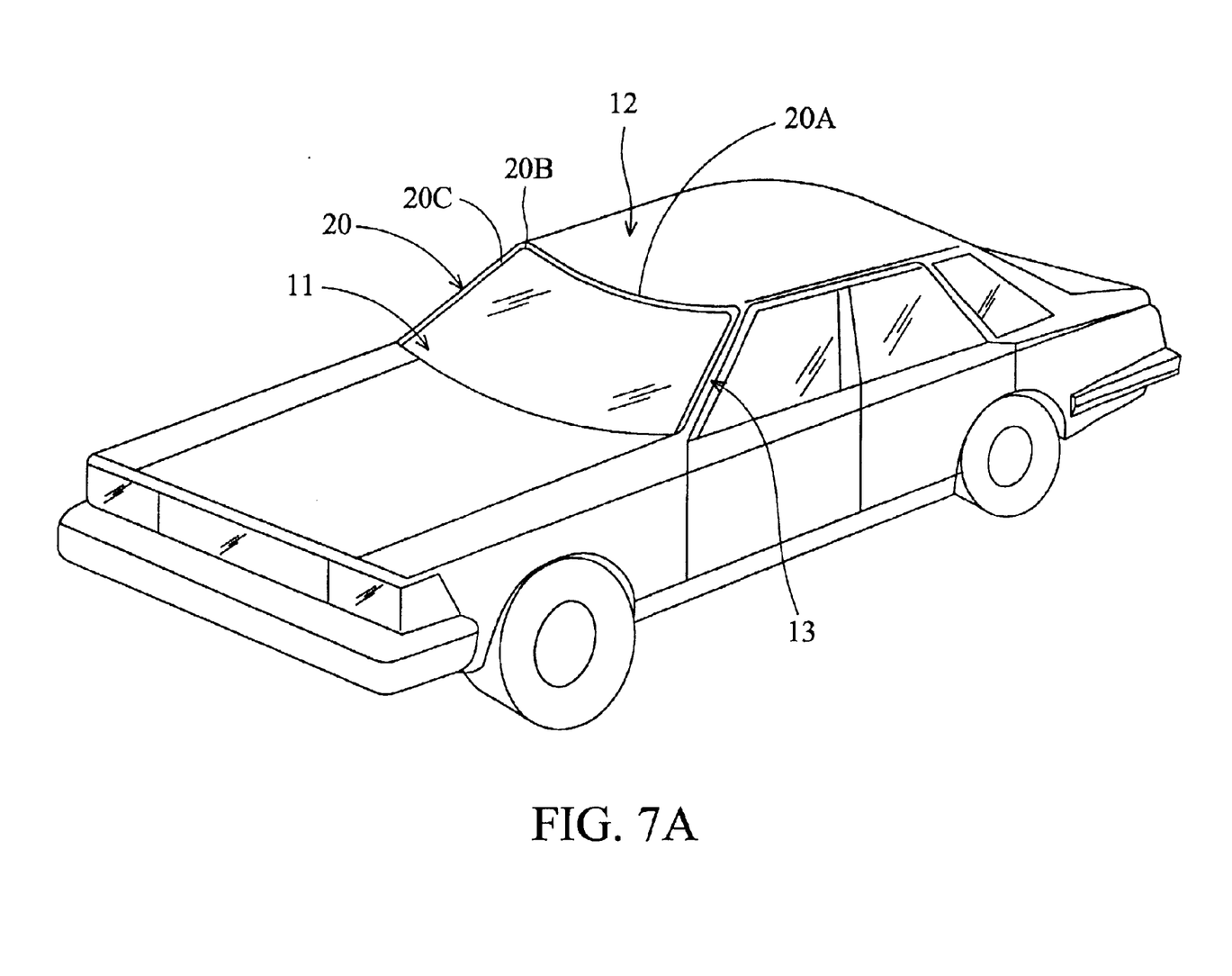
FIG. 7A illustrates automobile window molding of the present invention installed on the windshield of a car.
Figure 7B:
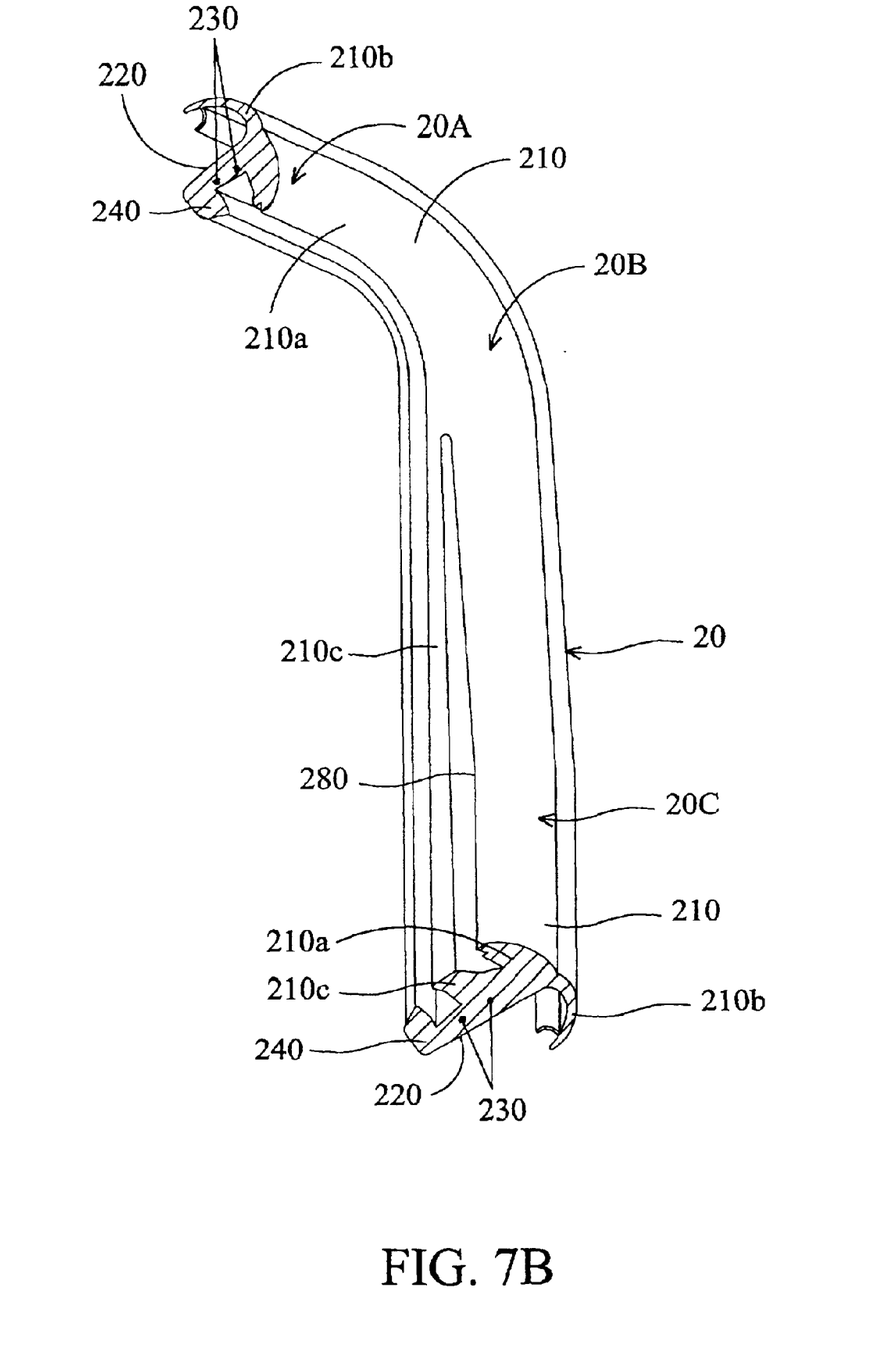
FIG. 7B illustrates the automobile window molding of the present invention.

A preferred embodiment of the present invention discloses a method and apparatus for producing automobile window molding 20 shown in FIG. 7. It is understood that this embodiment is for illustrative purposes only. The method and apparatus of the present invention is equally suitable for producing any continuous extrusion molding product with a varying profile, including automobile window molding with other specifications, plastic rope, and architectural frame molding.

As shown in FIGS. 7A and 7B, a molding strip 20 is a continuous plastic strip comprising three sections: an upper section 20A mounted between the upper edge of the windshield 11 and the roof panel 12, a side section 20C mounted between the side edges of windshield 11 and the pillar panels 13, and corner sections 20B joining the upper section 20A with side sections 20C at the corners of windshield 11. Molding strip 20 comprises exterior wing 210 including an inward wing portion 210a and an outward wing portion 210b, connecting portion 220, and foot 240.

Outward wing portion 210b is for covering the periphery of the vehicle body panels 12, 13 and is of uniform thickness along its length. The profile of molding strip 20 varies along the length of side section 20C such that inward wing portion 210a gradually thickens from corner section 20B to the central portion of side section 20C. As inward wing 210a thickens, connecting portion 220 lengthens and sub-inward wing 210c diverges from inward wing 210a to form water drain channel 280. Water drain channel 280 gradually widens and deepens towards the center of side section 20C and then gradually becomes thinner and shallower towards the lower extreme of side section 20C. The profile of corner section 20B is the same as that of upper molding 20A; the flexible quality of molding 20 allows it to be deformed and fitted around the corner of windshield 11. Metal wires 230 are embedded in molding strip 20 to reinforce the strip and provide length guidance during the manufacturing process.

Figure 8A:
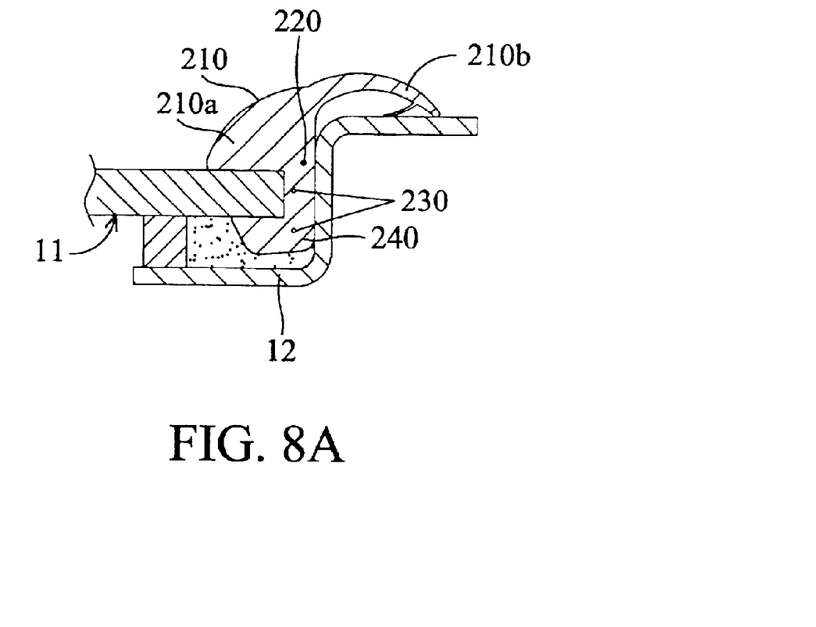
FIGS. 8A and 8B show cross-sectional views of the automobile windshield molding shown in FIG. 7 installed between a windshield and the frame of a vehicle.
Figure 8B:
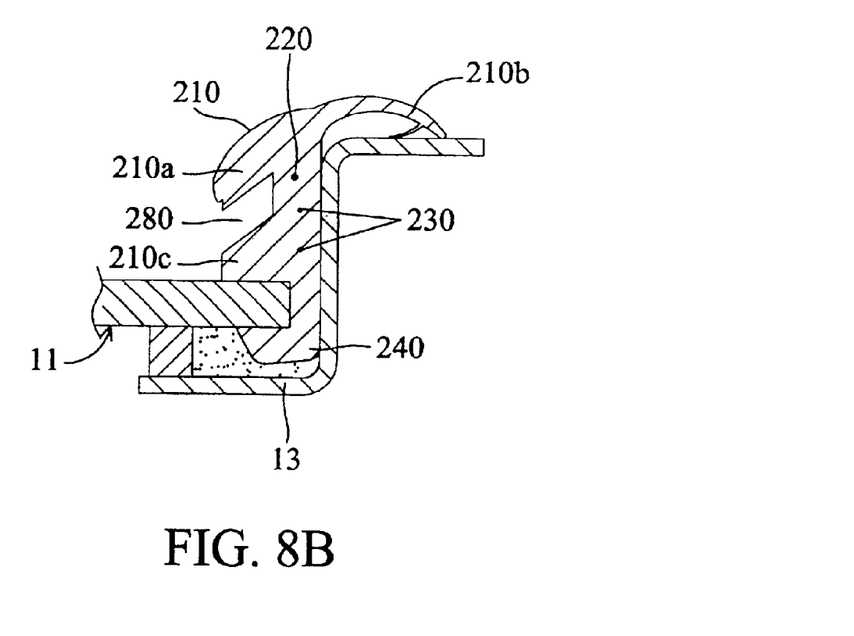

FIG. 8A shows a cross-sectional view of molding strip 20 installed between windshield 11 and roof panel 12. FIG. 8B shows a cross-sectional view of molding strip 20 installed between windshield 11 and a central portion of pillar panel 13. In FIG. 8A, the windshield 11 is received between foot 240 and inward wing 210a. In FIG. 8B, connecting portion 220 is lengthened and windshield 11 is received between sub-inward wing 210c and foot 240. A water drain channel 280 is formed between inward wing 210a and sub-inward wing 210c.

Figure 9A:
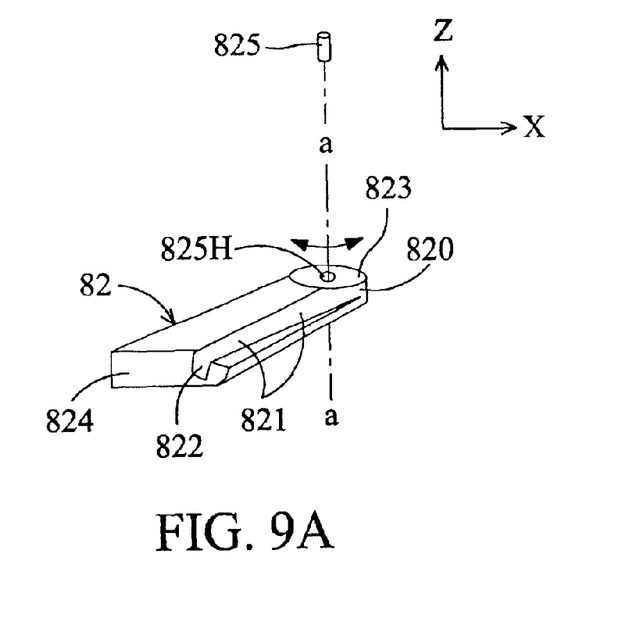
FIG. 9A illustrates the first shaping knife of the present invention in the X-Z plane.

FIG. 9A shows a shaping knife 82 of the present invention in the X-Z plane. Shaping knife 82 is generally planar in shape and comprises annular portion 823 at the distal end provided with a hole 825H, leading edge 820 and molding surfaces 821. Molding surfaces 821 traverse the shaping knife 82 longitudinally at a skewed angle such that trench 822 is cut across a corner of the knife to distal end 824. The contour of trench 822 at distal end 824 corresponds to the cross-sectional profile of foot 240. Leading edge 820 preferably offers a wedged profile. A pin 825 is received in hole 825H such that shaping knife 82 can rotate about the a—a axis, which in this illustration corresponds to the Z-axis. Thus, it is understood that shaping knife 82 rotates about an axis perpendicular to the flow direction of the molten material.

Figure 9B:
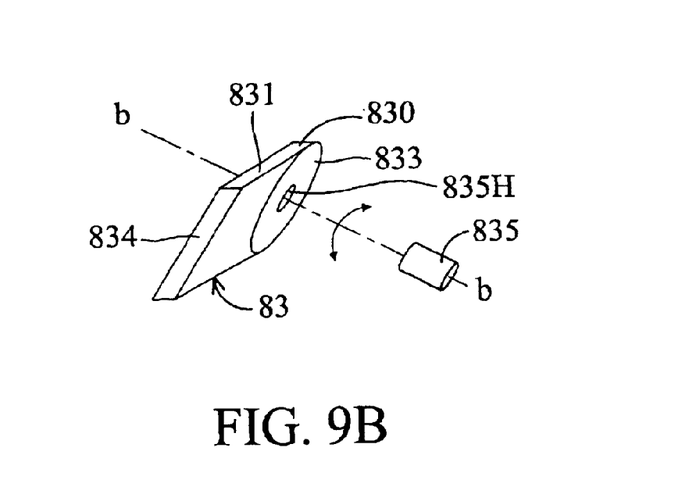
FIG. 9B illustrates the second shaping knife of the present invention in the X-Z plane

FIG. 9B shows a shaping knife 83 of the present invention in the X-Z plane. Shaping knife 83 is generally planar and comprises annular portion 833 provided with a hole 835H, leading edge 830, molding surface 831 and distal end 834. The contour of molding surface 831 corresponds to the cross-sectional profile of channel 280. Leading edge 830 preferably offers a wedged profile. A pin 835 is received in hole 835H such that shaping knife 83 can rotate about the b—b axis. The b—b axis is oblique to the flow direction of the molten material.

Figure 10A:
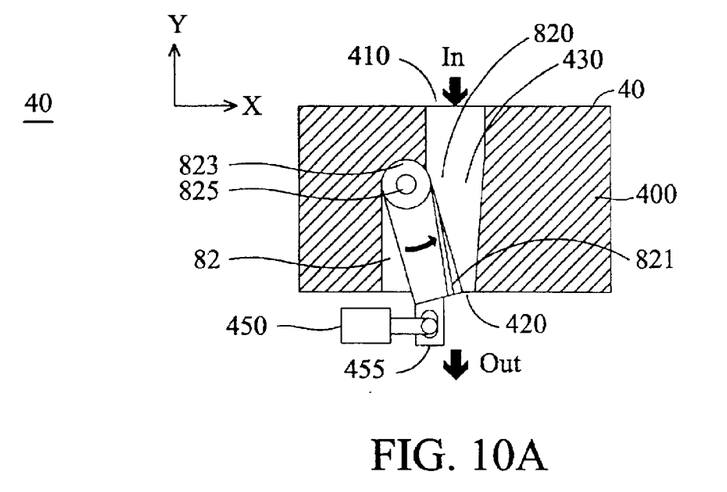
FIG. 10A shows a cross-sectional view of the first operational position of the first shaping knife in the X-Y plane.
Figure 10B:
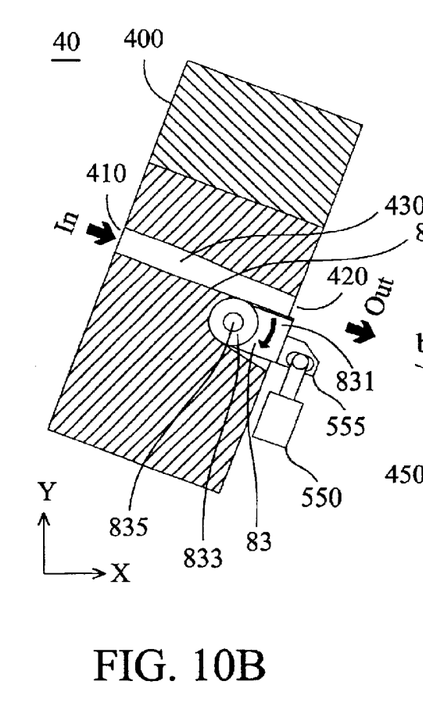
FIG. 10B shows a cross-sectional view of the first operational position of the second shaping knife.
Figure 10C:
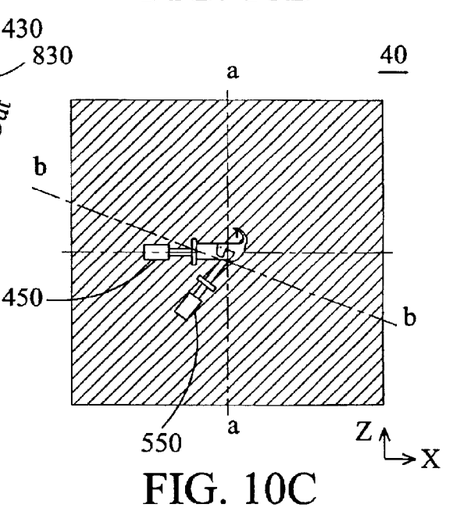
FIG. 10C shows a cross-sectional view of the molding machine of the present invention in the X-Z plane with the first and second shaping knives in a first operational position.
Figure 11A:
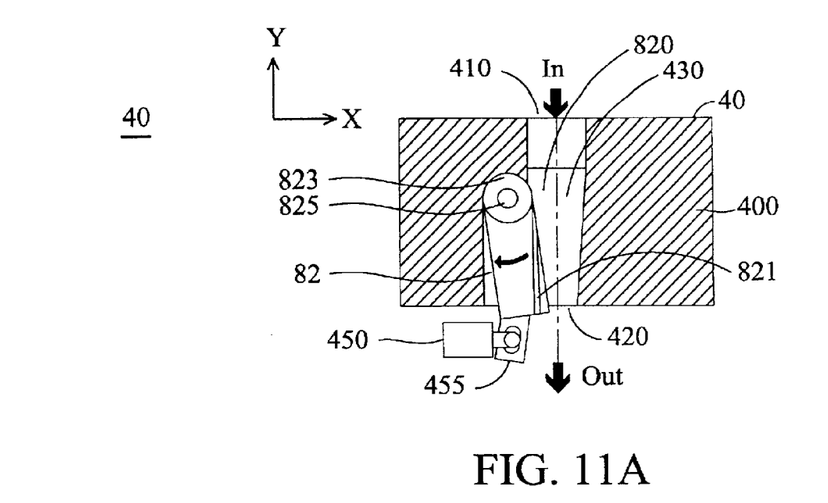
FIG. 11A shows a cross-sectional view of the second operational position of the first shaping knife in the X-Y plane.
Figures 11B, 11C, 11D:
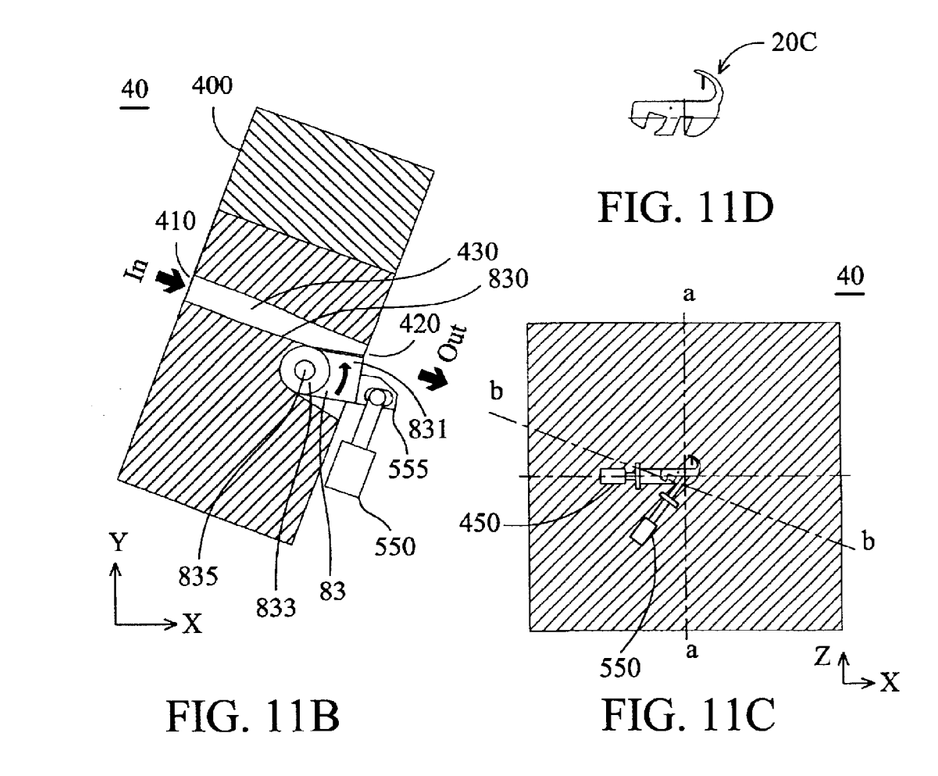
FIG. 11B shows a cross-sectional view of the second operational position of the second shaping knife.
FIG. 11C shows a cross-sectional view of the molding machine of the present invention in the X-Z plane with the first and second shaping knives in a second operational position.
FIG. 11D shows a profile of the extrudate of the molding machine of the present invention when the shaping knives are in a second operational position.
Figure 12A:
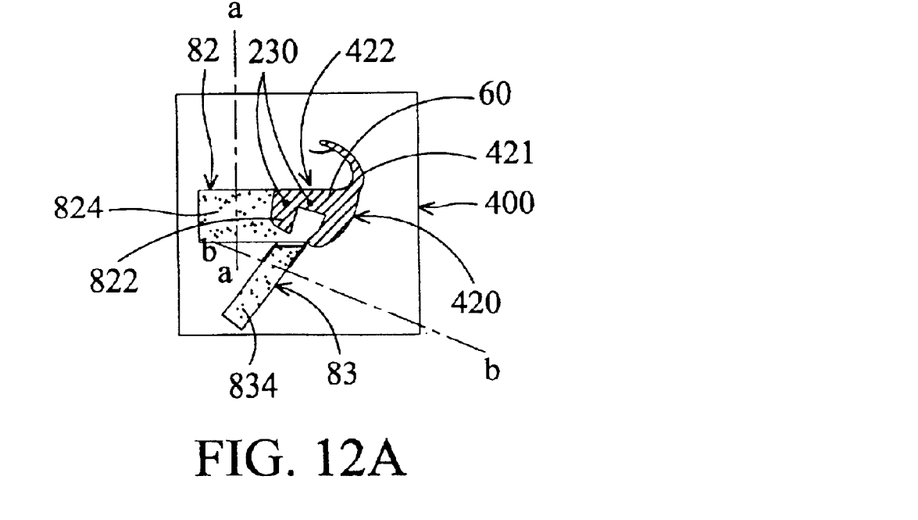
FIG. 12A shows a close-up of the extrusion outlet in the X-Z plane when the first and second shaping knives are in a first operational position.
Figure 12B:
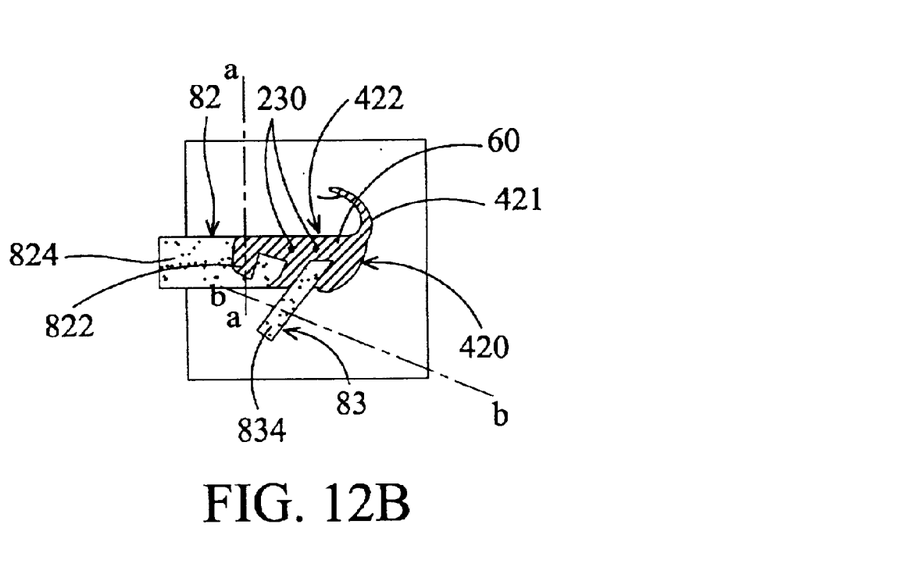
FIG. 12B shows a close-up of the extrusion outlet in the X-Z plane when the first and second shaping knives are in a second operational position.

FIGS. 10A–10C, 11A–11C and 12A–12B illustrate a molding machine 40 according to the preferred embodiment of the present invention. Molding machine 40 comprises a die 400 including inlet 410 and outlet 420 connected by channel 430, shaping knife 82 rotatably disposed on pin 825, shaping knife 83 rotatably disposed on pin 835, driving unit 450 connected to the shaping knife 82 via connector 455, and driving unit 550 connected to the shaping knife 83 via connector 555. Driving units 450 and 550, for example pistons or motors with converters, are for driving shaping knives 82, 83 to rotate around their respective pins between first and second operational positions, as described in detail below. FIGS. 12A and 12B show a close-up of outlet 420 and the proximal ends 824, 834 of shaping knives 82, 83 in the X-Z plane. Outlet 420 is an extrusion opening including molding surface 421 with a contour corresponding to the profile of wing 210 and molding surface 422 with a contour corresponding to the profile of connecting portion 220.

During the extrusion process, molten material 60 is received through inlet 410 and extruded from outlet 420. It is therefore understood that the molten material travels through channel 430 in a direction substantially parallel to the Y-axis, as indicated by the arrows in FIGS. 10A and 11A. Examples of molten material suitable include thermoplastic resin (for e.g., PVC, PE, PP, MCOC, Nylon, EVA, NBR), elastomer (e.g., TPE, TPU, TPO, rubber) and foam resin. A single molten material can be used in the fabrication of molding 20. Alternately, two or more materials can be applied to form a composite structure.

Figure 10D:
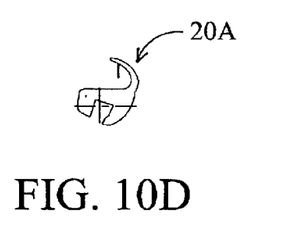
FIG. 10D shows a profile of the extrudate of the molding machine of the present invention when the shaping knives are in a first operational position.

Shaping knives 82, 83 are rotatable between first and second operational positions such that their molding surfaces, in conjunction with the molding surfaces 421, 422 of outlet 420, define two different contours, the first corresponding to the molding strip before the inward wing portion 210a thickens, e.g., the profile of the molding strip in sections 20A, 20B and the extreme ends of 20C, as illustrated in FIG. 10D, and the second corresponding to the profile of the molding strip 20 at the center of the side section 20C, as illustrated in FIG. 11D. It is understood, however, that a gradient range of intermediate contours exists between the first and second operational positions, and these intermediate profiles can be manipulated by modifying the disposition of the molding surfaces 821 and 831, as well as the speed of rotation and pressure of the molten material 60, so as to obtain an extrudate with a profile that varies across a gradient range of intermediate profiles.

FIGS. 10A, 10C and 12A illustrate the position of shaping knife 82 when in the first operational position. Namely, the shaping knife is positioned such that a greater portion of the knife is in channel 430 and molding surfaces 821 are in a first position. FIGS. 10B, 10C and 12A illustrate the position of shaping knife 83 when in the first operational position. Namely, the shaping knife is positioned such that the knife does not enter channel 430 and molding surface 831 is outside channel 430. FIGS. 11A, 11C and 12B illustrate the position of shaping knife 82 when in the second operational position in which a lesser portion of the knife is in channel 430 and molding surfaces 821 are in a second position. FIGS. 11B, 11C and 12B illustrate the position of shaping knife 83 with in the second operational positioning which the shaping is positioned with molding surface 831 in channel 430. Shaping knives 82, 83 can be reciprocally rotated between the first and second operational positions.

It is noted that shaping knife 82 is rotated about an axis perpendicular to the flow direction of molten material 60. Thus, when shaping knife 82 is rotated from the second operational position to the first operational position, the wedged profile of leading edge 820 cuts into the flow and directs it through the trench 822 formed by molding surfaces 821 with minimum disruption of the streamlines of the flow. Furthermore, when shaping knife 82 is rotated back into the second operational position, the wedged profile of leading edge 820 again allows smooth transition of the flow through molding surfaces 821 during rotation.

Similarly, shaping knife 83 is rotated about an axis oblique to the flow direction of molten material 60. When shaping knife 83 is rotated from the first operational position to the second operational position, the wedged profile of leading edge 830 cuts into the flow and directs it around molding surface 831 with minimum disruption of the streamlines of the flow. When shaping knife 83 is rotated back out of the flow into the first operational position, the wedged profile of leading edge 830 again allows smooth transition of the flow around molding surfaces 831 during rotation.

The following discussion explains the method of producing automobile windshield molding using the molding machine 40 described above.

Automobile windshield molding 20 is extruded as a single molding beginning with side section 20C, the proceeding with corner section 20B, upper section 20A, a second corner section 20B and a second side section 20C.

When side section 20C is first extruded, shaping knives 82 and 83 are set in their first operational positions as illustrated in FIGS. 10A–10C, such that taken together with molding surfaces 421, 422, the contour of outlet 410 is that illustrated in FIG. 12A corresponding to the profile of the automobile windshield molding 20 before the inward wing portion 210a is thickened. Metal wires 230 are fed in together with molten material 60 into inlet 410 and passed through channel 430 to outlet 420 such that molding 20 has the profile illustrated in FIG. 10D, e.g., the profile of the automobile windshield molding 20 before the inward wing portion 210a is thickened, is extruded. Metal wires 23 serve to reinforce the extrudate. Furthermore, metal wires 23 can be used to pull or draw out hardened extrudate and measure the length of the molding extruded. Metal foil or other suitable non-melting material may also be used.

After the side section 20C has been extruded for a certain length with the profile illustrated in FIG. 10D, shaping knives 82 and 83 are rotated to their second operational positions. It is understood that this rotation is gradual, allowing for a gradient change in the profile of the extrudate. Namely, as shaping knife 82 is rotated outwardly, leading edge 820 and molding surfaces 821 shift in position such that opening 420 gradually passes through a number of intermediary contours to that illustrated in FIG. 12B, viz. connecting edge 220 is elongated while foot 240 maintains its position at the end of the connecting edge 220 such that inward wing portion 210a is thickened. Similarly, as shaping knife 83 is rotated inwardly, leading edge 830 and molding surface 831 cut into the flow of molten material 60 such that opening 420 gradually passes through a number of intermediary contours to that illustrated in FIG. 12B, viz. a channel 280 is gradually cut into the thickening inward wing 210a, thereby dividing off sub-inward wing 210c from inward wing 210a. FIG. 11D shows a cross-sectional view of the extrudate when shaping knives 82 and 83 have reached their second operational positions, e.g., an extrudate with a profile of that of the automobile molding 20 at the center of side section 20C.

After the side section 20C has been extruded for a certain length with the profile illustrated in FIG. 11D, shaping knives 82 and 83 are rotated back to their first operational positions. As before, it is understood that this rotation is gradual, allowing for a gradient change in the profile of the extrudate. Namely, as shaping knife 82 is rotated inwardly, leading edge 820 and molding surfaces 821 shift in position such that opening 420 gradually passes back through a number of intermediary contours to that illustrated in FIG. 12A, viz. connecting edge 220 is shortened while foot 240 maintains its position at the end of the connecting edge 220 such that inward wing portion 210a becomes thinner. Similarly, as shaping knife 83 is rotated outwardly, leading edge 830 and molding surface 831 are removed from the flow of molten material 60 such that the profile of opening 420 gradually moves through a number of intermediary profiles to that illustrated in FIG. 12A, viz. the channel 280 gradually grows less deep and thinner until it inward wing 210a and sub-inward wing 210c merge and the channel 280 disappears. The molding 20 is then extruded for a certain length with the opening 420 having the profile illustrated in FIG. 12A corresponding to the upper extreme of side section 20C, the corner section 20B, the upper section 20A, the second corner section 20B, and the upper extreme of side section 20C.

To form the second side section 20C with a varying profile, the process describe above is repeated. Shaping knives 82 and 83 are rotated from their first operational positions to their second operational positions to form the center part of side section 20C, and then back again to their first operational positions to form the lower extreme of side section 20C.

While the invention has been described with reference to various illustrative embodiments, the description is not intended to be construed in a limiting sense. Various modifications of the illustrative embodiments, as well as other embodiments of the invention, will be apparent to those person skilled in the art upon reference to this description. For example, the use of one shaping knife or three or more shaping knives is equally suited to production of a molding product with varying profile according to the present invention. The shapes of the molding surfaces and the axes of rotation may also be altered to suit the desired profile of the extrudate.

It is therefore contemplated that the appended claims will cover any such modifications or embodiments as may fall within the scope of the invention defined by the following claims and their equivalents.

What is claimed is:

1. A molding machine for producing a continuous extrusion molding product with varying profile comprising:

a die with an inlet for receiving molten material, a channel, and an outlet, the channel directing the molten material from the inlet to the outlet along a first axis; and at least one shaping knife, rotatable around a second axis non-parallel to the first axis between a first operational position and a second operational position, the shaping knife having a first molding surface which defines a first contour in the outlet when the shaping knife is in the first operational position, and defines a second contour in the outlet when the shaping knife is in the second operational position.

2. The molding machine as claimed in claim 1, wherein the shaping knife is rotatable around an axis perpendicular to the first axis.

3. The molding machine as claimed in claim 1, wherein the shaping knife is rotatable around an axis oblique to the first axis.

4. The molding machine as claimed in claim 1, wherein the shaping knife has a leading edge which is wedge shaped.

5. The molding machine as claimed in claim 1, wherein the outlet comprises a second molding surface.

6. A molding machine for producing a continuous extrusion molding product with varying profile comprising:

a die with an inlet for receiving molten material, a channel, and an outlet, the channel directing the molten material from the inlet to the outlet along a first axis; and a first shaping knife, rotatable around a second axis non-parallel to the first axis between a first operational position and a second operational position, the shaping knife having a first molding surface; and a second shaping knife, rotatable around a third axis non-parallel to the first axis between a first operational position and a second operational position, the shaping knife having a second molding surface;

whereby the first and second molding surfaces together define a first contour in the outlet when the first and second shaping knives are in their first operational positions, and define a second contour in the outlet when the first and second shaping knives are in their second operational positions.

7. The molding machine as claimed in claim 1, wherein the shaping knife is rotatable around an axis perpendicular to the first axis.

8. The molding machine as claimed in claim 1, wherein the shaping knife is rotatable around an axis oblique to the first axis.

9. The molding machine as claimed in claim 1, wherein the shaping knife has a leading edge which is wedge shaped.

10. The molding machine as claimed in claim 1, wherein the outlet comprises a third molding surface.

11. The molding machine as claimed in claim 10, wherein the molding product is automobile windshield molding have an outer wing portion, an inner wing portion, and a foot, the profile of the inner wing portion varying between a first profile in which in the inner wing portion has a first thickness and a second profile in which the inner wing portion has a second thickness thicker than the first thickness, a water channel being formed in the inner wing portion of the second profile, wherein:

the contour of the first molding surface corresponds to the profile of the foot;

the contour of the second molding surface corresponds to the profile of the water drain channel; and the contour of the third molding surface corresponds to the outer wing;

wherein the contour of the outlet when the first and second shaping knives are in their first operational positions corresponds to the first profile; and the contour of the of the outlet when the first and second shaping knives are in their second operational positions corresponds to the second profile.

* * * * *